United States Patent Office 2,944,048
Patented July 5, 1960

2,944,048
PROCESS AND CATALYST FOR PRODUCTION OF OLEFIN POLYMERS

Gene Nowlin, Glen Burnie, Md., and Harold D. Lyons, Bartlesville, Okla., assignors to Phillips Petroleum Company, a corporation of Delaware No Drawing. Filed Dec. 30, 1955, Ser. No. 556,483

15 Claims. (Cl. 260—94.9)

This invention relates to the polymerization of olefins. In one aspect, this invention relates to an improved method for polymerizing olefins and to a novel catalyst therefor.

Reactions for polymerizing olefins are well known in the art and are generally carried out in the presence of catalysts. One type of catalyst which has been used in the polymerization of monoolefins, particularly ethylene, consists of organometal compounds, for example triethylaluminum, and the polymers which have been obtained in accordance with this method are generally liquid or low molecular weight solid polymers. Frequently, the polymers obtained are dimers or trimers of the olefin charged. However, it is often desirable to produce higher molecular weight polymers which have desirable properties of heat stability and can be molded into vessels, pipes and tubing. Such uses cannot be made of the lower molecular weight polymers, for example, a polymer having a molecular weight of about 1000, since a polymer of this molecular weight is a wax-like material.

It is an object of this invention, therefore, to provide an improved process for the production of high molecular weight olefin polymers.

A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising (1) a metal halide selected from the group consisting of halides of titanium, zirconium, hafnium and germanium, (2) a hydride selected from the group consisting of hydrides of aluminum, gallium, indium and thallium and complexes of said hydrides with alkali metal hydrides, and (3) an organic halide corresponding to the formula RX wherein R is an alkyl, cycloalkyl, alkenyl, cycloalkenyl, aryl, or alkynyl radical, or combinations of these radicals, e.g., aralkyl or alkaryl radicals, and X is a halogen. The improvement obtained when polymerizing an olefin in the presence of our novel catalyst is, firstly, the polymers of much higher molecular weight possessing very high impact strength and other desirable characteristics can be obtained than is true when certain of the prior art catalysts have been employed, and secondly, the polymerization reaction, particularly for ethylene, can be initiated and carried out at considerably lower temperatures and pressures than are necessary when employing the catalysts and the processes of the prior art.

The metal halide component of our catalyst system comprises the halides of the metals titanium, zirconium, hafnium and germanium. Examples of metal halides which can be used include titanium dichloride, titanium trichloride, titanium tetrachloride, titanium dibromide, titanium tribromide, titanium tetrabromide, titanium diiodide, titanium triiodide, titanium tetraiodide, titanium trifluoride, titanium tetrafluoride, zirconium dichloride, zirconium trichloride, zirconium tetrachloride, zirconium dibromide, zirconium tribromide, zirconium tetrabromide, zirconium tetraiodide, zirconium tetrafluoride, hafnium trichloride, hafnium tetrachloride, hafnium triiodide, hafnium tetraiodide, germanium dichloride, germanium trichloride, germanium tetrachloride, germanium dibromide, germanium tetrabromide, germanium diiodide, germanium tetraiodide, germanium difluoride, germanium tetrafluoride and the like. Mixtures of two or more of the metal halides can be employed in the catalyst system of our invention.

The metal hydrides used as a component of our catalyst system include the hydrides of the metals aluminum, gallium, indium and thallium. It is also within the scope of the invention to use complex hydrides corresponding to the formula MM'H$_x$, wherein M is an alkali metal, including sodium, potassium, lithium, rubidium and cesium, M' is a metal selected from the group consisting of aluminum, gallium, indium and thallium, and $x$ is equal to the sum of the valences of the two metals. Examples of such complex hydrides are lithium aluminum hydride, potassium aluminum hydride, sodium aluminum hydride, cesium aluminum hydride, sodium gallium hydride, lithium thallium hydride, lithium indium hydride, lithium gallium hydride, rubidium aluminum hydride and the like. Mixtures of two or more of the aforementioned hydrides and complex hydrides can be used in the practice of our invention.

The organic halides utilized as a component of our catalyst system correspond to the formula RX, wherein R is selected from the group consisting of alkyl, cycloalkyl, alkenyl, cycloalkenyl, aryl, and alkynyl radicals, and combinations of these radicals, and X is a halogen, including fluorine, chlorine, bromine and iodine. Examples of organic halides which can be used include methyl chloride, ethyl bromide, isopropyl iodide, n-butyl fluoride, tert-butyl chloride, p-tolyl bromide, allyl bromide, propargyl bromide, benzyl chloride, phenyl chloride, cyclopentyl bromide, cyclohexyl iodide, 3-bromocyclopentine, 3-methyl-4-fluorocyclohexene and the like. It is to be understood also that mixtures of two or more organic halides can be used in our catalyst system.

Among the catalyst compositions falling within the scope of this disclosure which are preferred because their use to catalyze the polymerization of olefins provides relatively high molecular weight polymers and/or permits the use of relatively low reaction temperatures and pressures are the following: a mixture of titanium tetrachloride, lithium aluminum hydride and allyl bromide; a mixture of titanium trichloride, lithium aluminum hydride and allyl bromide; a mixture of titanium tetrachloride, lithium aluminum hydride and ethyl bromide; a mixture of zirconium tetrachloride, lithium aluminum hydride and ethyl bromide; and a mixture of titanium trichloride, lithium aluminum hydride and ethyl bromide.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. As much as 50 to 2000 grams of polymer can be obtained per gram of the catalyst composition utilized in the reaction. When a continuous flow system is employed, the concentration of the total catalyst composition is usually in the range from 0.01 weight percent to 1.0 weight percent, or higher.

The ratio of the amounts of metal hydride to metal halide will generally be in the range of 0.05 to 50, preferably 0.2 to 3, mols of metal hydride per mol of metal halide. The ratio of the amount of organic halide to metal halide will usually be in the range of 0.05 to 50, preferably 0.2 to 3 mols of organic halide per mol of metal halide.

The materials which are polymerized in accordance with this invention can be defined broadly as polymerizable hydrocarbons. Preferably, the polymerizable hydrocarbons are olefins containing a $CH_2=C<$ radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl substituted and 1,2-dialkyl-substituted ethylenes can be used, such as butene-2, pentene-2, hexene-2, heptene-3, 2-methylbutene-1, 2-methylhexene-1, 2-ethylheptene-1, and the like. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and proplyene, ethylene and 1-butene, proplyene and 1-butene, or propylene and a pentene. Also, aryl olefins, e.g., styrene and alkyl-substituted styrenes can be polymerized to a solid polymer in the process of this invention. This invention is also applicable to the polymerization of a monomeric material comprising conjugated dienes containing from 4 to 8 or more carbon atoms. Examples of conjugated dienes which can be used include 1,3-butadiene, isoprene, 2,3-dimethylbutadiene, 2-methoxybutadiene, 2-phenylbutadiene, and the like. It is also within the scope of the invention to polymerize such conjugated dienes either alone or in admixture with each other and/or with one or more other compounds containing an active $CH_2=C<$ group which are copolymerizable therewith. Examples of such compounds are listed hereinabove. Examples of other compounds containing an active $CH_2=C<$ group include styrene, acrylonitrile, methyl acrylate, methyl methacrylate, vinyl chloride, 2-methyl-5-vinylpyridine, 2-vinylpyridine, and the like.

One of the important advantages obtained in the polymerization of olefins in the presence of our novel catalyst is that lower temperatures and pressures can be used than in certain of the prior art processes. The temperature can be varied over a rather broad range, however, such as from −250° F. and below to 500° F. and above. The preferred temperature range is from 50 to 300° F. Although pressures ranging from atmospheric and below up to 30,000 p.s.i.g. or higher can be employed, a pressure from atmospheric to 1000 p.s.i.g. is usually preferred with a pressure in the range of 100 to 700 p.s.i.g. being even more desirable.

In this connection, it is noted that it is preferred to carry out the reaction in the presence of an inert, organic diluent, preferably a hydrocarbon, with a pressure sufficient to maintain the diluent in the liquid phase, giving rise to a so-called "mixed-phase" system. However, the polymerization process of this invention proceeds in the gaseous or liquid phase without a diluent. The preferred pressure range set forth above has been found to produce solid polymers of olefins in excellent yields.

Suitable diluents for use in the polymerization process are paraffins, cycloparaffins and/or aromatic hydrocarbons which are relatively inert, non-deleterious and liquid under the conditions of the process. The lower molecular weight alkanes, such as propane, butane, and pentane, are particularly useful when carrying out the process at low temperatures. However, the higher molecular weight paraffins and cycloparaffins such as isooctane, cyclohexane and methylcyclohexane and the aromatic diluents, such as benzene, toluene, and the like can also be used, particularly when operating at higher temperatures. Halogenated hydrocarbons such as halogenated aromatics, halogenated paraffins and halogenated cycloparaffins, are also useful as diluents. Mixtures of any two or more of the above-listed diluents can be employed as well in the process of this invention.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefin that is polymerized. However, the residence time for the polymerization of aliphatic monoolefins, within the preferred temperature range of 50 to 300° F., falls within the range of one second to an hour or more. In the batch process, the time for the reaction can vary widely also, such as up to 24 hours or more.

It has been found that various materials in some instances may have a tendency to inactivate the catalyst compositions of this invention. These materials include carbon dioxide, oxygen and water. Therefore, it is usually desirable to free the polymerizable hydrocarbon from these materials, as well as from other materials which may tend to inactivate the catalyst before contacting the hydrocarbon with the catalyst. Any of the known means for removing such contaminants can be employed. When a diluent is used in the process, this material should generally be freed of contaminants, such as water, oxygen, and the like. It is desirable, also, that air and moisture be removed from the reaction vessel before the reaction is carried out. However, in some cases small amounts of catalyst inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, any excess olefin is vented and the contents of the reactor, including the solid polymer swollen with diluent, are then treated to inactivate the catalyst and remove the catalyst residues. The inactivation of the catalyst can be accomplished by washing with an alcohol, water or other suitable material. In some instances, the catalyst inactivating treatment also removes a major proportion of the catalyst residues while in other cases it may be necessary to treat the polymer with an acid, base or other suitable material in order to effect the desired removal of the catalyst residues. The treatment of the polymer may be carried out in a comminution zone, such as a Waring Blendor, so that a finely divided polymer is thereby provided. The polymer is then separated from the diluent and treating agents, e.g., by decantation or absorption, after which the polymer is dried. The diluent and treating agents can be separated by any suitable means, e.g., by fractional distillation, and reused in the process.

A more comprehensive understanding of the invention may be obtained by referring to the following illustrative examples which are not intended, however, to be unduly limitative.

EXAMPLE I

Ethylene was polymerized in a 2700 cubic centimeter stainless steel rocking autoclave in the presence of a catalyst consisting of 2 grams of lithium aluminum hydride and 5 grams of titanium tetrachloride. The catalyst components were charged to the reactor containing 500 cubic centimeters of benzene (dried over sodium) while maintaining the reactor under a nitrogen atmosphere. The reactor was then sealed and pressured with ethylene to 300 p.s.i.g. at 70° F. Heat was applied to the reactor by means of an electric heater. The reaction started immediately as indicated by an increase in temperature. After 65 minutes, the pressure had dropped to 150 p.s.i.g. while the temperature had risen to 240° F. About 15 minutes later, the reactor was repressured with ethylene to 400 p.s.i.g., and 10 minutes thereafter the reactor was again repressured to 550 p.s.i.g. The reaction was allowed to continue for an additional 100 minutes at which time the pressure was 300 p.s.i.g. and the temperature was 300° F. At this point the reactor was cooled and opened. Approximately 500 cubic centimeters of isopropyl alcohol was added to the reactor and the reactor contents were then comminuted in a Waring Blendor for about 15 minutes. The polymer was then washed with water. The properties of the ethylene polymer recovered are presented below in Table I.

*Table I*

| | |
|---|---|
| Molecular weight (based on melt index) | 10,300 |
| Melting point, ° F. | 249±2 |
| Impact strength (falling ball method) | Broke at 12″ |
| Melt index | 36.3 |
| Density, grams/cc. at room temperature | 0.968 |
| Color | Light yellow |

EXAMPLE II

Ethylene was polymerized in the same reactor as in Example I in the presence of a catalyst consisting of 2 grams of lithium aluminum hydride, 5 grams of titanium tetrachloride, and 7 grams of allyl bromide. The catalyst components were charged to the reactor, which contained 500 cubic centimeters of benzene (dried over sodium), while maintaining the reactor under a nitrogen atmosphere. The reactor was then sealed and pressured with ethylene to 300 p.s.i.g. at 70° F. The reaction was allowed to continue for 91 minutes at which time the temperature was 227° F. and the pressure was 250 p.s.i.g. The reactor was then cooled and opened. About 500 cubic centimeters of isopropyl alcohol was then added to the reactor after which the entire reactor contents were charged to a Waring Blendor and comminuted for approximately 15 minutes. About 80 grams of polymer was recovered. The properties of a sample of this ethylene polymer are presented below in Table II.

*Table II*

| | |
|---|---|
| Molecular weight (based on inherent viscosity) | 38,605 |
| Melting point, ° F. | 252±3 |
| Inherent viscosity [1] | 1.579 |
| Density, grams/cc. at room temperature | 0.979 |
| Color | Tan |

[1] The inherent viscosity was obtained at 130° C., using a solution of 0.2 gram of polymer per 100 milliliters of tetralin.

EXAMPLE III

Ethylene was polymerized in a reactor similar to that used in Example I in the presence of a catalyst consisting of 3.77 grams of lithium aluminum hydride, 2 grams of titanium tetrachloride and 10.9 grams of ethyl bromide. The catalyst components were charged to the reactor, which contained 400 cubic centimeters of benzene (dried over sodium), while flushing the reactor with purified nitrogen. The reactor was then sealed and pressured with ethylene to 500 p.s.i.g. at 75° F. The reaction started immediately, but to ensure a more rapid reaction heat was applied to the reactor by an electric heater. The heater was started about 20 minutes after the reactor was pressured with ethylene. After an additional 20 minutes, there was a sudden rise in temperature; so the heater was turned off. The reaction was then allowed to continue for approximately 6 hours at which time the temperature was 323° F. and the pressure was 340 p.s.i.g. At this point the reactor was repressured with ethylene to 600 p.s.i.g. The reaction was allowed to continue for an additional 30 minutes after which the unreacted ethylene was vented and the reactor cooled. The reaction product was found to be a solid mass which was very difficult to remove from the reactor. This solid was dried overnight, broken up and comminuted in a Waring Blendor with about 500 cubic centimeters of methyl alcohol. The polymer was recovered by filtration and dried overnight in a vacuum oven at 80° C. and 29 inches of mercury vacuum. About 130 grams of ethylene polymer was obtained. The properties of a sample of this polymer are presented below in Table III.

*Table III*

| | |
|---|---|
| Molecular weight (based on melt index) | 50,000 |
| Melting point, ° F. | 247±2 |
| Impact strength (falling ball method) | >72″ |
| Melt index | 0.241 |
| Color | Dark brown |

The ethylene used in the above examples was passed through a purification system prior to charging to the reactors in order to remove oxygen, carbon dioxide and water vapor. The purification system comprised a pyrogallol solution, a sodium hydroxide solution and drying agents.

From a consideration of the data shown in Tables I, II and III, it is seen that the addition of an organic halide to the catalyst composition consisting of a metal hydride and a metal halide resulted in an ethylene polymer having a higher molecular weight and possessing greatly increased impact strength.

The polymers produced in accordance with this invention have utility in applications where solid plastics are used. They can be used to impregnate paper and fabrics, and they can be molded to form articles of any desired shape, such as bottles and other containers for liquids. Furthermore, they can be formed into pipe by extrusion.

It will be apparent to those skilled in the art that variations and modifications of the invention can be made upon study of the foregoing disclosure. Such variations and modifications are believed to be clearly within the spirit and scope of the invention.

We claim:

1. A method for polymerizing an aliphatic 1-olefin having up to and including 8 carbon atoms per molecule which comprises contacting said olefin with a catalyst consisting essentially of (1) a metal halide selected from the group consisting of halides of titanium, zirconium, hafnium and germanium, (2) a hydride selected from the group consisting of hydrides of aluminum, gallium, indium and thallium and complexes of said hydrides with alkali metal hydrides, and (3) an organic halide corresponding to the formula RX, wherein R is selected from the group consisting of alkyl, cycloalkyl, alkenyl, cycloalkenyl, aryl, and alkynyl radicals, and combinations of these radicals, and X is a halogen, the ratio of the amounts of the components of said catalyst being in the range of from 0.2 to 3 mols of said hydride per mol of said metal halide and in the range of from 0.2 to 3 mols of said organic halide per mol of said metal halide.

2. A method in accordance with claim 1 wherein said olefin is ethylene and said catalyst consists essentially of a mixture of titanium tetrachloride, lithium aluminum hydride and allyl bromide.

3. A method in accordance with claim 1 wherein said olefin is ethylene and said catalyst consists essentially of a mixture of titanium trichloride, lithium aluminum hydride and allyl bromide.

4. A method in accordance with claim 1 wherein said olefin is ethylene and said catalyst consists essentially of a mixture of titanium tetrachloride, lithium aluminum hydride and ethyl bromide.

5. A method in accordance with claim 1 wherein said olefin is ethylene and said catalyst consists essentially of a mixture of zirconium tetrachloride, lithium aluminum hydride and ethyl bromide.

6. A method in accordance with claim 1 wherein said olefin is ethylene and said catalyst consists essentially of a mixture of titanium trichloride, lithium aluminum hydride and ethyl bromide.

7. A method for producing a solid polymer of an aliphatic 1-olefin having up to and including 8 carbon atoms per molecule which comprises contacting said olefin with a catalyst consisting essentially of (1) a metal halide selected from the group consisting of halides of titanium, zirconium, hafnium and germanium, (2) a hydride selected from the group consisting of hydrides of aluminum, gallium, indium and thallium and complexes of said hydrides with alkali metal hydrides, and (3) an organic halide corresponding to the formula RX, wherein R is selected from the group consisting of alkyl, cycloalkyl, alkenyl, cycloalkenyl, aryl, and alkynyl radicals, and combinations of these radicals, and X is a halogen, the ratio of the amounts of the components of said catalyst being in the range of from 0.2 to 3 mols of said hydride per mol of said metal halide and in the range of from 0.2 to 3 mols of said organic halide per mol of said metal halide, said contacting occurring at a temperature in the range of −250° F. to 500° F., in the presence of a hydrocarbon diluent, inert and liquid under conditions of the method, at a pressure sufficient to maintain said diluent in liquid phase, and recovering the solid polymer so produced.

8. A method for polymerizing ethylene which comprises contacting ethylene with a catalyst consisting essentially of a mixture of titanium tetrachloride, lithium aluminum hydride and allyl bromide, the ratio of the amount of the components of said catalyst being in the range of from 0.2 to 3 mols of said hydride per mol of said tetrachloride and in the range of from 0.2 to 3 mols of said allyl bromide per mol of said tetrachloride, said contacting occurring in the presence of a hydrocarbon diluent, inert and liquid under conditions of the method, at a temperature in the range of 50 to 300° F., and a pressure in the range of 100 to 700 p.s.i.g.

9. A method for polymerizing ethylene which comprises contacting ethylene with a catalyst consisting essentially of a mixture of titanium tetrachloride, lithium aluminum hydride and ethyl bromide, the ratio of the components of said catalyst being in the range of from 0.2 to 3 mols of said hydride per mol of said tetrachloride and in the range of from 0.2 to 3 mols of said ethyl bromide per mol of said tetrachloride, said contacting occurring in the presence of a hydrocarbon diluent, inert and liquid under conditions of the method, at a temperature in the range of 50 to 300° F., and a pressure in the range of 100 to 700 p.s.i.g.

10. A catalyst composition consisting essentially of (1) a metal halide selected from the group consisting of halides of titanium, zirconium, hafnium and germanium, (2) a hydride selected from the group consisting of hydrides of aluminum, gallium, indium and thallium and complexes of said hydrides with alkali metal hydrides, and (3) an organic halide corresponding to the formula RX, wherein R is selected from the group consisting of alkyl, cycloalkyl, alkenyl, cycloalkenyl, aryl, and alkynyl radicals, and combinations of these radicals, and X is a halogen, the ratio of the amounts of the components of said catalyst composition being in the range of from 0.2 to 3 mols of said hydride per mol of said metal halide and in the range of from 0.2 to 3 mols of said organic halide per mol of said metal halide.

11. A catalyst composition consisting essentially of a mixture of titanium tetrachloride, lithium aluminum hydride and allyl bromide, the ratio of the amounts of materials in said mixture being in the range of from 0.2 to 3 mols of said hydride per mol of said tetrachloride and in the range of from 0.2 to 3 mols of said allyl bromide per mol of said tetrachloride.

12. A catalyst composition consisting essentially of a mixture of titanium trichloride, lithium aluminum hydride and allyl bromide, the ratio of the amounts of materials in said mixture being in the range of from 0.2 to 3 mols of said hydride per mol of said trichloride and in the range of from 0.2 to 3 mols of said allyl bromide per mol of said trichloride.

13. A catalyst composition consisting essentially of titanium tetrachloride, lithium aluminum hydride and ethyl bromide, the ratio of the amounts of materials in said mixture being in the range of from 0.2 to 3 mols of said hydride per mol of said tetrachloride and in the range of from 0.2 to 3 mols of said ethyl bromide per mol of said tetrachloride.

14. A catalyst composition consisting essentially of a mixture of zirconium tetrachloride, lithium aluminum hydride and ethyl bromide, the ratio of the amounts of materials in said mixture being in the range of from 0.2 to 3 mols of said hydride per mol of said tetrachloride and in the range of from 0.2 to 3 mols of said ethyl bromide per mol of said tetrachloride.

15. A catalyst composition consisting essentially of a mixture of titanium trichloride, lithium aluminum hydride and ethyl bromide, the ratio of the amounts of materials in said mixture being in the range of from 0.2 to 3 mols of said hydride per mol of said trichloride and in the range of from 0.2 to 3 mols of said ethyl bromide per mol of said trichloride.

References Cited in the file of this patent

UNITED STATES PATENTS

| | | |
|---|---|---|
| 2,467,162 | Schutze | Apr. 12, 1949 |
| 2,520,439 | Sailors | Aug. 29, 1950 |
| 2,666,756 | Boyd et al. | Jan. 19, 1954 |
| 2,699,457 | Ziegler | Jan. 11, 1955 |
| 2,713,044 | McArthur et al. | July 12, 1955 |
| 2,721,189 | Anderson et al. | Oct. 18, 1955 |
| 2,726,231 | Field et al. | Dec. 6, 1955 |
| 2,816,883 | Larchar et al. | Dec. 17, 1957 |
| 2,822,357 | Brebner et al. | Feb. 4, 1958 |
| 2,825,721 | Hogan et al. | Mar. 4, 1958 |
| 2,832,759 | Nowlin et al. | Apr. 29, 1958 |
| 2,834,768 | Friedlander | May 13, 1958 |

FOREIGN PATENTS

| | | |
|---|---|---|
| 534,792 | Belgium | Jan. 31, 1955 |